Oct. 11, 1960

C. F. WINDER ET AL 2,956,171

ELECTRICAL CIRCUIT

Filed April 22, 1957

INVENTORS
CLAYTON F. WINDER
EDWARD M. JONES
BY
Attorneys

United States Patent Office 2,956,171
Patented Oct. 11, 1960

2,956,171

ELECTRICAL CIRCUIT

Clayton F. Winder, Anderson Township, Hamilton County, and Edward M. Jones, Cincinnati, Ohio; said Winder assignor to The Baldwin Piano Company, Cincinnati, Ohio, a corporation of Ohio Filed Apr. 22, 1957, Ser. No. 654,114

3 Claims. (Cl. 250—211)

The present invention relates generally to electrical circuits for use in analogue to digital optical encoders, and more particularly to circuits employing photocell assemblies for such encoders.

The patent application of William Pong entitled "Encoder," Serial No. 631,818, filed December 31, 1956, discloses an optical encoder employing photocells which have a pair of confronting electrodes and a mass of photoconductive semiconductor material disposed between the electrodes. The spacing between the electrodes is sufficiently small to permit the construction of optical encoders capable of resolving small angles without the aid of a radial-defining slit disposed between the code disc of the encoders and the photocells. The patent application of Edward M. Jones, entitled, "Optical Encoder," Serial No. 655,653, filed April 29, 1957, discloses optical encoder circuits employing assemblies of photocells of the type disclosed in the Pong application.

While photocells have been constructed with confronting electrodes disposed at very small distances from each other in order to eliminate a radial-defining slit in an optical encoder, experience has indicated that such photocells have short operational lives. The inventor has found that static electricity developing between the electrodes of such a photocell is of sufficient magnitude to break down the electrical insulation formed by the photoconductive mass disposed between the electrodes, hence destroying the photocell.

It is one of the objects of the present invention to provide an electrical circuit having a plurality of photocells with spaced apart electrodes and a mass of photoconductive material disposed between the electrodes in which the life of the photocells is substantially greater than heretofore.

It is also an object of the present invention to provide an optical encoder which employs photocells having spaced confronting electrodes and masses of semiconductor photoconductive material disposed between the electrodes in which the electrodes are spaced by sufficiently short distances to eliminate the necessity of a radial-defining slit and in which substantial electrostatic charges do not develop across the electrodes.

These and additional objects of the present invention will become readily apparent upon a further reading of this disclosure, particularly when viewed in the light of the drawings, in which.

Figure 1:
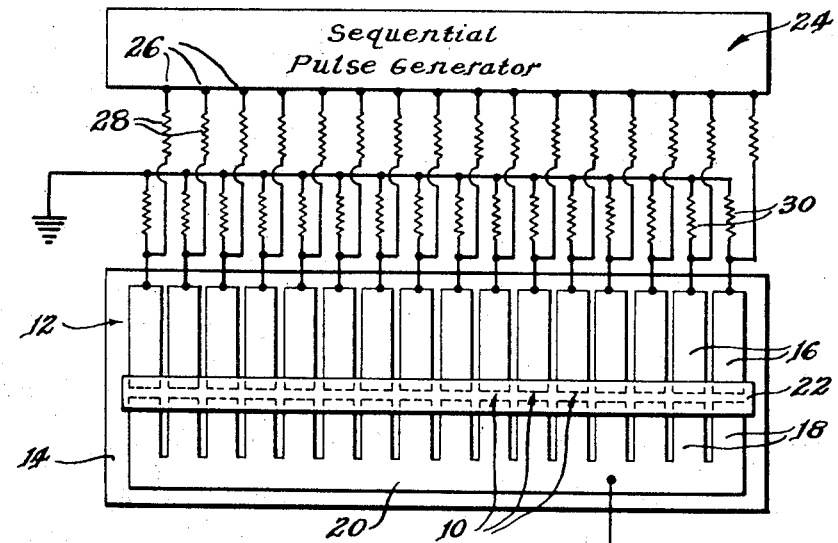
Figure 1 is a fragmentary schematic electrical circuit diagram of an optical encoder constructed according to the teachings of the present invention, the photocell assembly thereof being illustrated in plan view.

As illustrated in Figure 1, a plurality of photocells 10 are constructed in a common assembly 12. The photocell assembly 12 has a base plate 14 of electrically insulating material, such as glass, and two groups of confronting electrodes 16 and 18 in the form of electrically conducting films are disposed on opposite sides of a common axis confronting each other and spaced from each other by a common distance. The electrodes 18 are interconnected by a bar 20. The distance between confronting electrodes 16 and 18 is exceedingly small, of the order of 4 microns, so that electrostatic charges constitute a substantial potential gradient between the electrodes. In one particular construction of this invention, the electrodes 16 and 18 are placed upon the base plate 14 by photoetching techniques, and are constructed of Inconel.

A mass of photoconductive material in film form is disposed between each pair of confronting electrodes 16 and 18, this mass forming a ribbon 22. The photoconductive material is material of the semiconductor class, such as cadmium selenide, cadmium sulfide, lead sulfide, lead selenide, zinc selenide, zinc sulfide, zinc telluride, germanium, lead telluride, and silicon, and the interelectrode impedance of each of the photocells is greatly changed when the mass of photoconductive material between the electrodes of that particular cell is subjected to light. For additional details of the construction of the photocell assembly, reference is made to the Pong application, referred to above.

Photocells of the type described above may be connected in various types of electrical circuits for sampling the photocells, as is fully explained in the Jones application referred to above. Such circuits employ some means for determining the interelectrode impedance of the photocells, since the impedance of a cell is greatly reduced by illumination. Generally, this is accomplished by transmitting a pulse of known amplitude through the cell and noting the decrease in the amplitude of the pulse. One of these sampling systems is illustrated in combination with the photocell assembly 12. In this system, a sequential pulse generator 24 is employed to pulse each of the photocells in sequence relative to time. The sequential pulse generator 24 has an output terminal 26 for each of the electrodes 16 of the photocell assembly 12, and the output terminals 26 are connected through resistors 28 to the electrodes 16 of the photocell assembly 12. Also, each of the electrodes 16 of the photocell assembly is connected to a common ground connector through a resistor 30. The interconnected electrodes 18 of the photocell assembly 12 are connected to a common amplifier 32, and also to the ground connector through a resistor 34.

It is to be noted that in conventional constructions, the resistor 34 is large, and the magnitude of the resistors 30 is relatively small. As a result, static electricity which may develop between the electrodes 16 and 18 of the photocell assembly will not readily be discharged through the resistors 30 and 34. Further, in view of the fact that the spacing between the electrodes is extremely small, as small as 4 microns, the potential gradient which develops between the electrodes 16 and 18 becomes large, hence making it likely that the ribbon 22 of photoconductive material between the electrodes will be unable to withstand this gradient.

Figure 3:
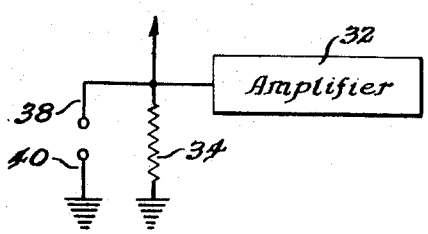
Figure 3 is a detail schematic electrical circuit diagram of the same fragment of the circuit of Figure 1 illustrating another embodiment of the present invention.

According to the teachings of this invention, means to limit the potential gradient between each pair of electrodes 16 and 18, or a static arrester 36, is connected in parallel with the resistor 34, and hence in a series circuit with the electrodes 16 and 18 and the resistors 30. This potential gradient limiting means does not alter potentials appearing between the electrodes of amplitude below a threshold value, but prevents potentials greater than this value from developing. The static arrester 36 may be of the conventional type employed to discharge static charges from antennas and the like, such as illustrated in Figure 3. In this type of arrester, a pair of spaced electrodes 38 and 40 confront each other at a sufficiently small distance to discharge static charges which develop across the electrodes. The electrical insulation afforded by such an arrester must break down prior to the ribbon 22 in order to protect the photocells 10, and hence the electrodes 38 and 40 must be spaced from each other by a distance no greater than that between the electrodes 16 and 18.

Figure 2:
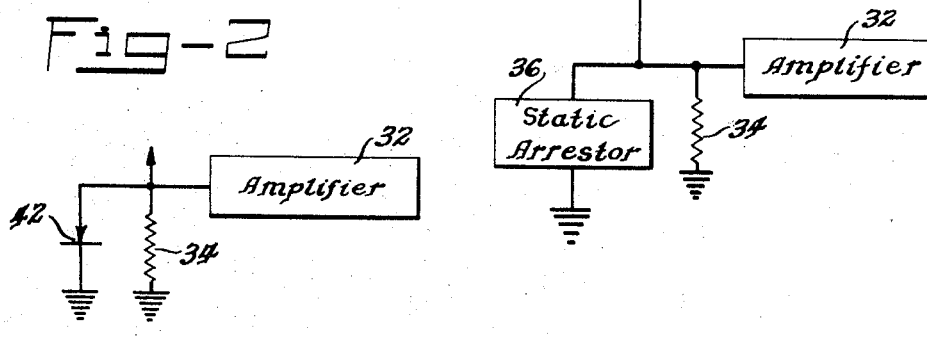
Figure 2 is a schematic electrical diagram illustrating in detail a fragment of the circuit illustrated in Figure 1.

A more suitable static arrester is formed by a Zener diode, illustrated at 42 in Figure 2. A Zener diode is nonconducting throughout a limited range of voltages impressed across the diode, known as the Zener voltage of the diode, and conducting for voltages above and below this range. Since the sequential pulse generator 24 in the illustrated embodiment delivers pulses negative in sign to the photocell assembly 12, a negative pulse is transmitted from the common electrode or bar 20 of the photocell assembly to the amplifier 32. By selecting a Zener diode 42 with a Zener voltage slightly greater than the potential developed by the photocell assembly and transmitted to the amplifier 32, the pulses are transmitted to the amplifier without alteration, but electrostatic charges of greater magnitude, whether positive or negative, are conducted through the diode 42 and hence discharged. As a result, the photocell assembly 12 will be protected from destruction resulting from the development of electrostatic charges. In one particular construction of an optical encoder according to the teachings of the present invention, the pulses impressed upon the input of the amplifier 32 have a maximum amplitude of approximately 3 volts negative. Hence a Zener voltage of approximately 10 volts will permit transmission of the pulses from the photocell assembly 12 to the amplifier 32, but will limit the potential gradient across the photocell assembly 12 to permissible values. A suitable Zener diode is the type 1N203 manufactured by National Semiconductor Products Company.

From the foregoing disclosure, those skilled in the art will readily devise many modifications of the present invention and extend the invention to additional devices. It is therefore intended that the scope of the present invention be not limited by the foregoing disclosure, but rather only by the appended claims.

The invention claimed is:

1. An electrical circuit comprising a photocell having a pair of spaced confronting electrodes and a mass of semiconductor photoconductive material disposed between the confronting electrodes, means for determining the interelectrode impedance of the photocell including a pulse generator connected to one of the electrodes of the photocell, and a Zener diode connected between the electrodes of the photocell having a Zener voltage greater than the magnitude of the pulses from the pulse generator and less than the breakdown potential of the photocell.

2. An electrical circuit comprising a photocell assembly having a plurality of pairs of confronting electrodes spaced at about 4 microns and a mass of semiconductor photoconductive material disposed between the electrodes, a pulse generator connected to one electrode of each pair, an amplifier connected to the other electrode of each pair, and means to limit the potential gradient between the electrodes to a safe value connected directly to one electrode of each pair and through an impedance to the other electrode of each pair.

3. An electrical circuit comprising the elements of claim 2 wherein the potential gradient limiting means consists of a Zener diode.

References Cited in the file of this patent
UNITED STATES PATENTS

| | | |
|---|---|---|
| 2,714,702 | Shockley | Aug. 2, 1955 |
| 2,745,956 | Baker | May 15, 1956 |
| 2,768,310 | Kazan et al. | Oct. 23, 1956 |
| 2,779,897 | Ellis | Jan. 29, 1957 |
| 2,789,254 | Bodle et al. | Apr. 16, 1957 |
| 2,803,815 | Wulfsberg | Aug. 20, 1957 |
| 2,836,766 | Halsted | May 27, 1958 |

OTHER REFERENCES

"Optical Elements for Computers," article by Marshall et al., pp. 159–163 of the May 2, and 3, 1952, issue of Proceedings of the Ass'n. of Computing Machinery.